April 5, 1927.
N. C. STOREY
VEHICLE
Filed Sept. 28, 1923     3 Sheets-Sheet 2
1,623,214
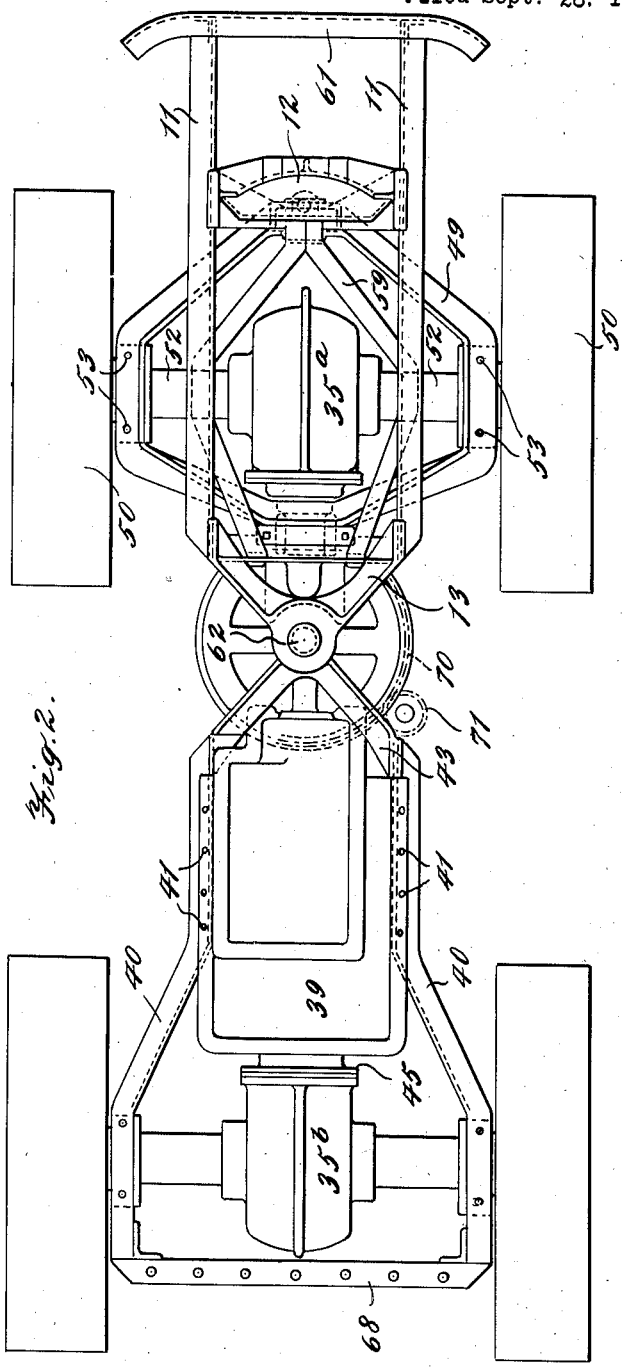
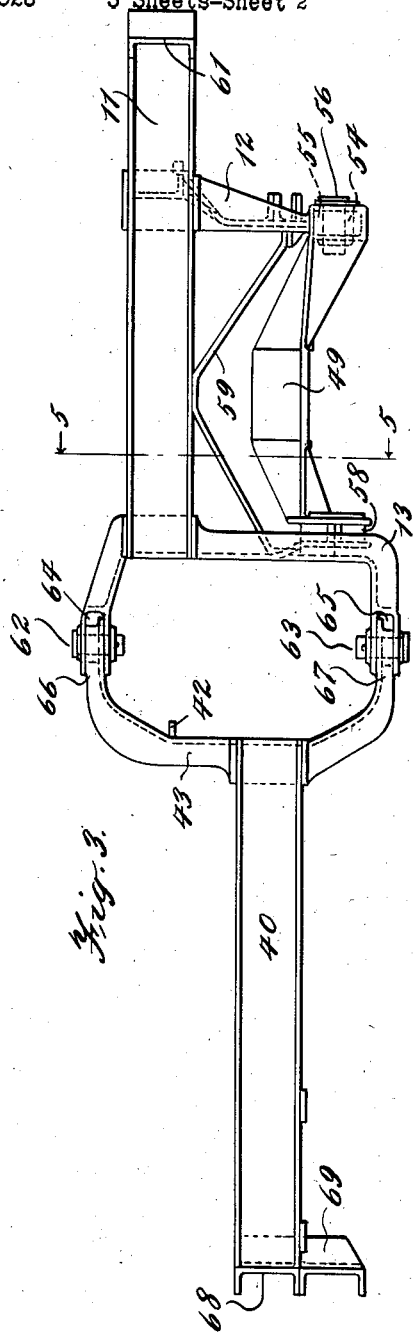
INVENTOR.
Norman C. Storey
BY
Gifford, Bull & Scull
his ATTORNEYS April 5, 1927.
N. C. STOREY
1,623,214
VEHICLE
Filed Sept. 28, 1923   3 Sheets-Sheet 3
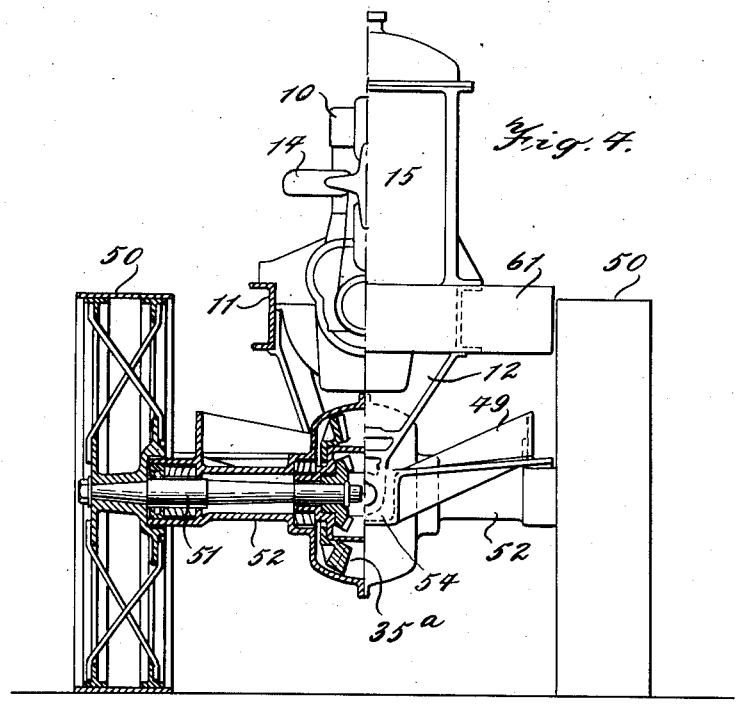
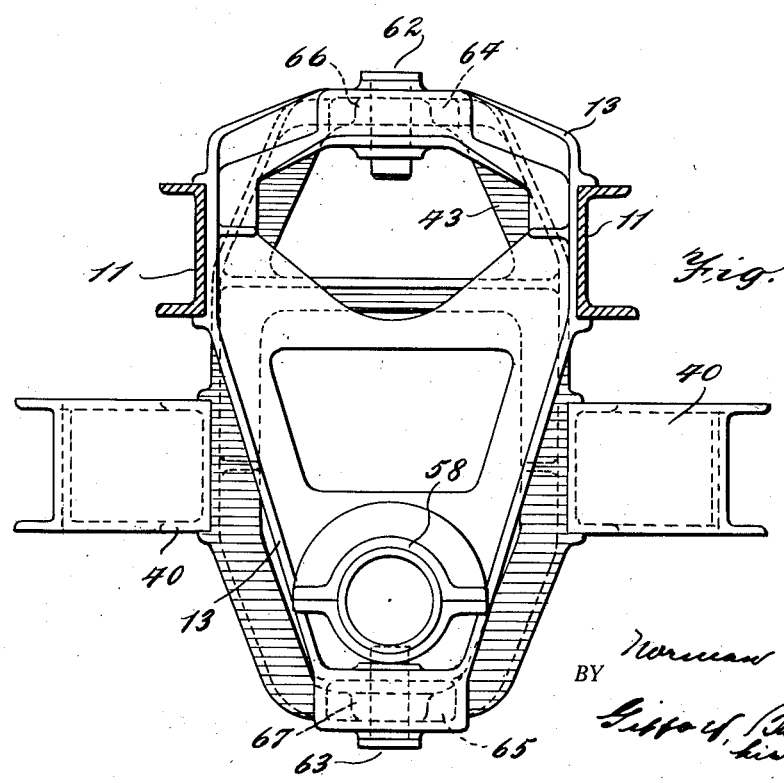
INVENTOR.
Norman C. Storey
BY
Gifford, Bull & Lauer
his ATTORNEYS Patented Apr. 5, 1927.

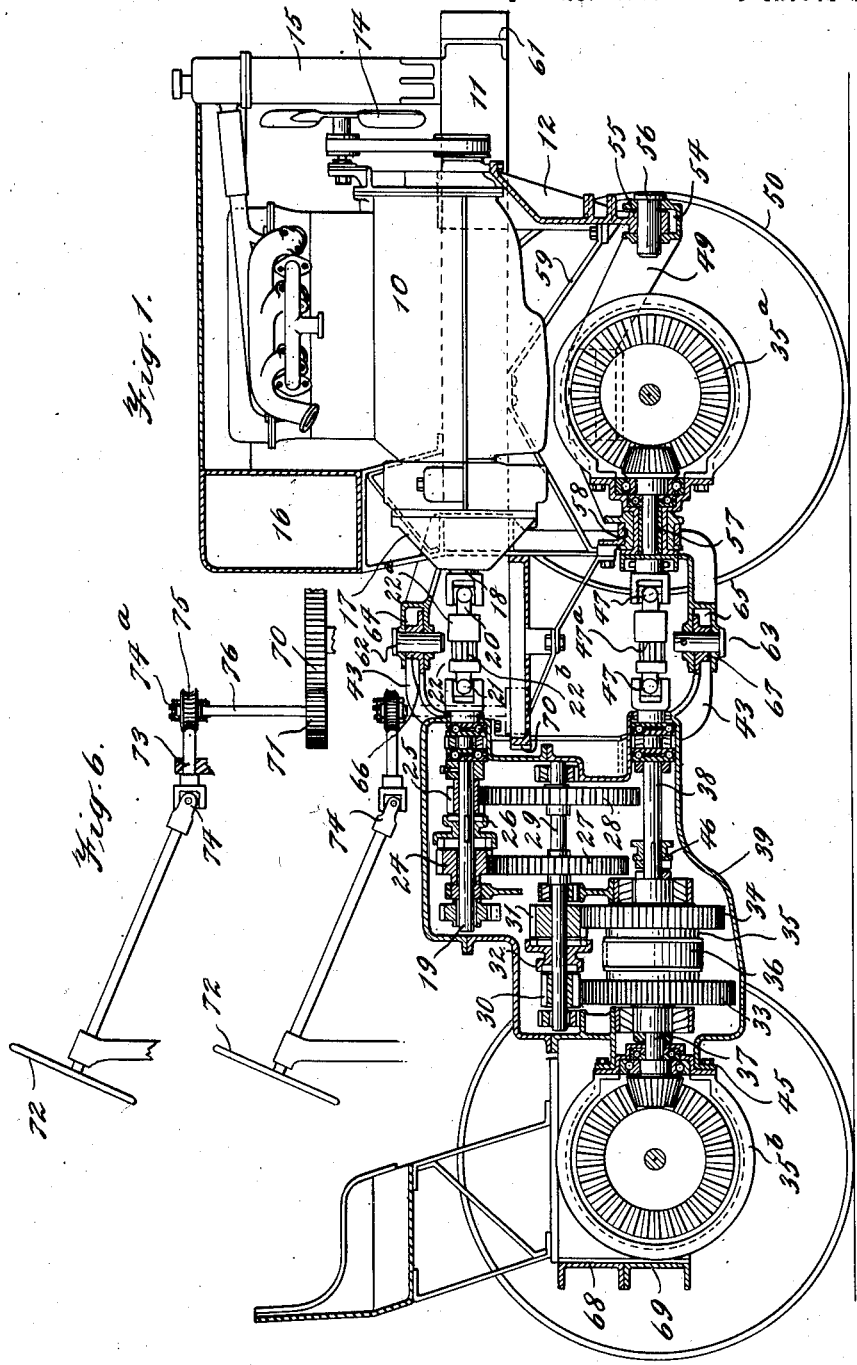

1,623,214

UNITED STATES PATENT OFFICE.

NORMAN C. STOREY, OF PASSAIC, NEW JERSEY.

VEHICLE.

Application filed September 28, 1923. Serial No. 665,300.

My invention relates to a vehicle and more particularly to a vehicle of the motor-driven type.

One of the objects of my invention is a tractor having great flexibility for adjusting itself to irregular surfaces and which operates with the highest possible efficiency under adverse conditions.

Another object of my invention is a tractor of the foregoing type having a short turning radius.

Other objects of my invention will appear in the specification and will be particularly pointed out in the claims.

My invention will best be understood by reference to the accompanying drawings in which Fig. 1 is a longitudinal section through a tractor embodying my invention; Fig. 2 is a plan view thereof, the motor and driving connections being omitted; Fig. 3 is a side view of the frame members of the form shown in Fig. 2; Fig. 4 is a view partially in section and partially in front end elevation; Fig. 5 is a vertical sectional elevation taken on the line 5—5 of Fig. 3, with certain parts omitted, and Fig. 6 is a detail illustrating steering mechanism for the vehicle.

Like reference characters indicate like parts throughout the drawings.

Referring to the drawings, 10 is a motor for propelling the vehicle and is supported on a structural frame 11 which is, in turn, supported at its forward end by a strut 12 and at the rear end by a frame 13. The motor is here illustrated as an internal combustion engine cooled by a fan 14, the radiator being indicated at 15 and the fuel supply tank at 16.

In the bell-shaped housing 17, for the fly wheel, (not illustrated), is mounted a clutch (not illustrated) for the drive shaft 18, the clutch being suitably controlled by levers which constitute no part of my present invention and which, therefore, have not been shown. Power from the motor is transmitted from the drive shaft 18 to a shaft 19 in the transmission through connections comprising universal joints 20 and 21, the connections between the shafts 18 and 19 preferably comprising an adjustable member 22 in the form of two telescoping sections 22$^a$ and 22$^b$ connected to the universal joints 20 and 21, respectively, and by which the two shafts 18 and 19 may longitudinally adjust themselves to each other under the relative movements of the front and rear portions of the vehicle. The shaft 19 is provided with two driving pinions 24 and 25 which are loosely mounted on the shaft, one or the other of said pinions being brought into operative engagement with said shaft by means of a clutch 26 which may be operated by any desired means. The pinions 24 and 25 mesh with gears 27 and 28, mounted on a countershaft 29. Loosely mounted on the countershaft 29 are pinions 30 and 31, which are driven from the shaft 29 through a selective clutch 32, which may be operated in any desired manner. The pinions 30 and 31 mesh with gears 33 and 34, which are bolted or otherwise secured on a differential casing 35, which is or may be identical with that shown for the front wheels in Figure 4 and will be more fully hereinafter described. In the centre of the casing for the differential is preferably mounted a friction brake, the band for which is indicated at 36 and which may be operated in any desired manner, as will be understood. The differential 35 forms the main driving member for two drive shafts 37 and 38 for driving the rear and forward sets of wheels, respectively, through other differentials, the differential for the forward driving wheels, which has heretofore been referred to, being indicated at 35$^a$. The parts of the transmission are housed in a transmission casing 39 mounted on a channel frame 40, as best shown in Figures 2 and 3, and is held in place through flanges by bolts 41, as best shown in Figure 2. It is also supported on a bracket 42 on a member 43. The transmission case is also provided at its rear portion with a flange 45 which is bolted or otherwise secured to a similar flange on the rear differential casing 35$^b$. A clutch 46, which may be operated in any desired manner, is preferably provided for locking the drive shaft 38 for the front wheels to the differential 35, so that both the front and rear wheels are positively driven. The shaft 38 which transmits power to the front wheels is preferably provided with universal joints 47 with an interposed telescoping member 47$^a$, all of which are or may be similar to the universal joints 20 and 21 and the interposed adjustable member above described. The rear driving wheels are rigidly but rotatably mounted on the rear truck frame 40. The forward wheels are mounted in a frame 49. The forward drive wheels 50 are mounted on axles 51 which are mounted in the axle housing 52, the latter being bolted to frame 49 as at 53. The frame 49 on which the forward wheels are mounted is pivotally mounted for tiltable movement on the front truck frame. For this purpose the forward end of the frame 49 is provided with a pocket 54, in which is received a tongue or lug 55 of the frame 12, the two being provided with openings through which a pin 56 passes and secures the two parts together. The rear part of the frame 49 is provided with a bearing indicated at 57, which is received in a box 58 of the frame 13. The bearings for the frame 49 are in axial alignment with the drive shaft 38, and the drive shaft is, therefore, tiltable about the axis of said shaft, so that the drive is not affected by the tilting movement of the front wheels. The forward frame is preferably braced by a strut 59, as best shown in Fig. 3. The structural frame 11 is preferably connected at its forward end by a transverse member 61, shown in the form of a channel iron. The forward and rear sections of the tractor are vertically hinged at 62 and 63 to permit relative horizontal movement between the two. The casting 13 is preferably provided with upper and lower pockets 64 and 65 to receive tongues 66 and 67 of the frame 43. Channels 68 and 69 secure together the rear end of the frame 40 and provide means for draw-bar connections.

Steering is accomplished through a segment 70 on the frame 13 of the forward section, the segment meshing with a pinion 71 (see Figs. 2 and 6) mounted on the frame 43 of the rear section, pinion 71 being rotated by means of a steering wheel 72 through a shaft 73 and flexible joint 74, the end of the shaft 73 being provided with a worm 74ª meshing with a worm wheel 75 secured on the upper end of a shaft 76 on the lower end of which is mounted the pinion 71.

I claim:

1. A vehicle comprising a front and a rear truck frame, drive wheels rigidly but rotatably mounted on said rear frame, a wheel frame tiltably mounted on said front truck frame about an axis extending longitudinally of the vehicle, drive wheels mounted on said wheel frame, a vertical pivotal connection between said truck frames, a driving motor mounted on said forward truck frame, a transmission mounted on said rear truck frame means comprising flexible couplings for transmitting power from said motor to said transmission, means for transmitting power from the transmission to the rear wheels, and means comprising flexible couplings for transmitting power from the transmission to the front wheels 2. A vehicle comprising front and rear truck frames, a motor for driving the vehicle mounted on the front truck frame, rear wheels rigidly but rotatably mounted on the rear truck frame, and front wheels mounted on a frame which is tiltable on the front truck frame, the two truck frames being pivoted together vertically to permit relative horizontal movement between the two, and means for driving the vehicle from said motor.

3. A vehicle comprising front and rear truck frames, a motor for driving the vehicle mounted on the front truck frame, rear wheels rigidly but rotatably mounted on the rear truck frame, and front wheels mounted on a frame which is tiltable about an axis extending longitudinally of the vehicle, and means for driving the vehicle from said motor.

4. A vehicle comprising front and rear truck frames, a motor for driving the vehicle mounted on the front truck frame, rear wheels rigidly but rotatably mounted on the rear truck frame, front wheels mounted on a frame which is tiltable on the front truck frame, and means for driving the front wheels from said motor.

5. A vehicle comprising front and rear truck frames, a motor for driving the vehicle mounted on the front truck frame, rear wheels rigidly but rotatably mounted on the rear truck frame, front wheels mounted on a frame which is tiltable on the front truck frame, and means for driving both the front and the rear wheels from said motor.

6. A vehicle comprising front and rear truck frames, a motor for driving the vehicle mounted on the front truck frame, rear wheels rigidly but rotatably mounted on the rear truck frame, front wheels mounted on a frame which is tiltable on the front truck frame, and a drive connection between said motor and both sets of wheels, said connection comprising a differential mechanism.

7. A vehicle comprising front and rear truck frames, a motor for driving the vehicle mounted on the front truck frame, rear wheels rigidly but rotatably mounted on the rear truck frame, front wheels mounted on a frame which is tiltable on the front truck frame, and a drive connection between said motor and both sets of wheels, said connections comprising a differential mechanism, and means for locking said differential mechanism whereby both the front and the rear wheels are positively driven.

8. A vehicle comprising front and rear truck frames, a motor for driving the vehicle mounted on the front truck frame, front wheels mounted on the front truck frame, a drive shaft for said front wheels, said front wheels being tiltable about the axis of said drive shaft on bearings alined with said drive shaft.

9. In a tractor, front and rear frames, said frames being pivoted together vertically to maintain relative vertical positions between the two and to permit relative horizontal movement between them, a driving motor mounted on the front frame, tractor wheels pivotally mounted on said front frame, and rear wheels rigidly but rotatably mounted on said rear frame.

10. A vehicle comprising front and rear truck frames, a motor for driving the vehicle mounted on the front truck frame, rear wheels rigidly but rotatably mounted on the rear truck frame, and front drive wheels connected by means of trunnions to permit free tilting movement between said front wheels and said front frame.

11. A vehicle comprising front and rear frames each carrying tractor wheels, a motor for driving the vehicle mounted on one of said frames, means for connecting said motor to all of said tractor wheels, said frames being pivoted together to permit relative horizontal movement between the two, and means to accomodate said motor connecting means to the different relative positions of said frames.

NORMAN C. STOREY.